United States Patent Office 3,435,012
Patented Mar. 25, 1969

3,435,012
ANAEROBIC SEALANT COMPOSITION CONTAINING MONOACRYLATE ESTERS
Birger W. Nordlander, Schenectady, N.Y., assignor to Loctite Corporation, Newington, Conn., a corporation of Connecticut
No Drawing. Filed Aug. 2, 1965, Ser. No. 484,507
Int. Cl. C09j 3/14; C09k 3/10; C08f 3/64
U.S. Cl. 260—88.3                                    12 Claims

ABSTRACT OF THE DISCLOSURE

Polymerizable anaerobic adhesives and sealants (compositions which cure in the absence of air) can be prepared from monoacrylate esters and hydroperoxides. The acrylate esters which can be used are those wherein the alcoholic moiety of the ester contains an activating group for the polymerization reaction, such as hydroxy, cyano and amino groups.

---

The present invention relates to polymerizable composition and more particularly to sealant compositions for bonding adjacent metal surfaces, which compositions utilize polymerizable esters and exhibit anaerobic curing characteristics, that is, the ability to polymerize rapidly and spontaneously to the solid state upon the exclusion of air or oxygen while remaining in the liquid, unpolymerized state so long as contact with air or oxygen is maintained.

A principal object of the present invention is to provide a new and improved anaerobic curing composition utilizing acrylic and methacrylic esters which heretofore have not been considered capable of providing anaerobic sealant properties.

Another object of the present invention is to provide a method of imparting anaerobic curing characteristics to polymerizable compositions which do not require the use of polyacrylate monomers or the constant passage of gaseous oxygen through the system to maintain the composition in the unpolymerized liquid state.

It has been known heretofore that the polymerization of acrylic and methacrylic esters may be initiated by the addition of small amounts of conventional peroxide catalysts such as benzoyl peroxide. However, such catalysts do not impart anaerobic curing characteristics to acrylic ester monomers and polymerization is not dependent upon the presence or absence of air.

It has also been known that certain polymerizable acrylate monomers can be stabilized against polymerization under normal or elevated temperature conditions by passing air or oxygen through the monomer. In United States Patent No. 2,628,178 it was disclosed that a certain class of oxygenated polyacrylate monomers exhibit anaerobic curing characteristics; however, it was required that a constant brisk current of air be bubbled through the composition during storage to prevent autogenous polymerization. The anaerobic monomers of that patent are obtained by oxygenating compounds corresponding to the following general formula:

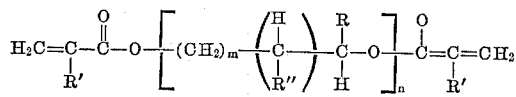

wherein R is a member selected from the class consisting of hydrogen —CH$_3$, —C$_2$H$_5$, —CH$_2$OH and

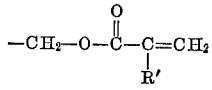

radicals, R' is a member selected from the class consisting of hydrogen, chlorine and the methyl and ethyl radicals, R" is a member selected from the class consisting of hydrogen, —OH radical, and

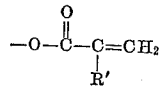

radical; $m$ is an integer equal to at least 1, e.g., from 1–8, or higher, for instance from 1–4, inclusive; $n$ is an integer equal to at least 2, for example, from 2–20 or more; and $p$ is one of the following: 0, 1.

Later, in United States Patent No. 2,895,950, there was further disclosed anaerobic curing composition utilizing unoxygenated monomers within the foregoing formula which polymerize to the solid state in the presence of certain organic hydroperoxide catalysts rapidly and spontaneously upon the exclusion of air or oxygen from the composition. In addition, that polyacrylate system is said to provide adequate shelf life in the liquid state so long as some contact with air is maintained and without the necessity of bubbling air through the liquid.

In accordance with the present invention it has been found that compositions exhibiting anaerobic curing characteristics can now be formulated utilizing a particular class of monoacrylate ester monomers. The required characteristics are obtained by adding to the particular class of monoacrylate esters small amounts of a certain type of catalyst which will promote the polymerization of the monomer upon exclusion of air, preferably with the addition of tertiary amines. The ingredients may be mixed at ordinary room temperature and at a time which is well in advance of the actual use of the composition. So long as some air is present, which may be nothing more than a small layer of air in a properly shaped sealed container, such as a polyethylene bottle or other container which permits the passage of air therethrough, the material will not polymerize for periods of time as long as one year or more. However, when the mixture is entirely excluded from contact with air, such as when the same is applied between adjacent metal surfaces such as between the threads of a metal connection or between plates, etc., the material will rapidly polymerize and form a strong bond. The time required to form such a bond upon the exclusion of air may be varied over a wide range by the proper selection of the particular materials and the amounts thereof, and by varying the temperature during polymerization. If desired, the setting time when air is excluded may be reduced to as little as a few minutes or may be extended to the range of an hour or so where rapid setting is not essential or desirable.

The anaerobic curing composition to which the present invention is directed are those which utilize monomers broadly categorized as monoacrylate esters. However, not all such esters are effective and the present invention is directed more particularly to esters containing additional reactive centers on the alcoholic or nonacrylic portion of the ester. More specifically the monomers may be categorized as having the formula A*–B wherein A* is the alcoholic portion of the ester connected to B through the ester linkage of the monomer and has at least one reactive center, as hereinafter defined; and B is a single, terminal, vinyl-containing group having the formula:

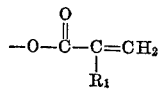

wherein R$_1$ is a member selected from the class consisting of hydrogen, halogen, and lower alkyl radicals of 1–4 carbon atoms.

By the term "reactive center" is means an active radical, such as labile hydrogen, the hetero atom of a heterocyclic ring, hydroxy, alkyl substituted amino, cyano and halogen radicals, capable of establishing the cross linking and strong molecular association with other monomers. Within this definition is included only those aliphatic and carbocyclic groups which satisfy the cross linking requirement, other aliphatic or carbocyclic groups being excluded therefrom.

Exemplary of the monomers falling within the above category are 2-hydroxyethyl methacrylate, hydroxypropyl methacrylate, cyanoethyl acrylate, t-butylaminoethyl methacrylate, dimethylaminoethyl methacrylate, glycidyl methacrylate, chlorobenzyl acrylate, cyclohexyl methacrylate and tetrahydrofurfuryl methacrylate. The foregoing compositions may comprise comercial grades of such polymerizable materials in which inhibitors or stabilizers such as hydroquinone may be present. However, care should be taken to insure that the concentration of impurities and particularly metal ions is not excessive. Additionally, it is within the scope of the invention to obtain modified characteristics by utilizing one or more of the said materials with other unsaturated monomers such as unsaturated hydrocarbons or unsaturated esters.

In accordance wth the invention it has been found that the above monoacrylates will not exhibit the desired anaerobic characteristics, particularly long-term stability, if the concentration of free metal ions in the composition exceeds about 20–50 parts per million. Such concentrations of metal ions are frequently found in commercial grades of material which have been shipped or temporarily stored in metal containers. Consequently, in such instances it is essential that the monomer be purified or otherwise treated to, in effect, remove the metal ions from the composition prior to formulation. The permissible upper limit will of course vary somewhat depending on the particular materials used, however, the above stated limitation has been found to be a satisfactory guide in most situations.

In the aforementioned United States Patent No. 2,895,954 there is described and claimed anaerobic curing compositions having the desired air stability by the use of certain nonpolymerizing organic hydroperoxides, which hydroperoxides are characterized by the fact that the atoms directly linked to the carbon atom bearing the hydroperoxide radical are selected from the group consisting of carbon, hydrogen, nitrogen or oxygen, and in such cases where all of the said directly linked atoms are carbon, not more than two of said carbon atoms comprise the carbon atom of a methyl group. Some of these hydroperoxide catalysts may be produced readily by direct substitution, and others are produced by oxygenation of compounds in the liquid phase, particularly by passing oxygen or an oxygen-containing gas through the compounds, preferably ethers, ketones and hydrocarbons. These catalysts have been found to be latent initiators of polymerization of the aforesaid monomers and their mixture with the monomer is highly sensitive to contact with air so that the catalyst remains inactive or ineffective in the presence of oxygen, but upon exclusion therefrom will initiate polymerization of the monomer. Further details concerning the preparation and specific examples of such hydroperoxide catalysts can be readily obtained from the specification of the aforementioned patent.

In addition to those organic hydroperoxide catalysts defined by that patent, it has been found that the present invention additionally enables the utilization of concentrated hydrogen peroxide (90 pecent) and the entire class of organic hydroperoxides including materials hydrolyzable or decomposable to hydroperoxides, such as peresters and hydroxy peroxides, for the preparation of anaerobic curing compositions having the characteristic of stability in the presence of air at ambient temperatures for extended periods of time. Some of those catalysts, however, do not have a sufficient degree of activity for certain commercially suitable applications and require acceleration by an additional agent. In United States Patent No. 3,046,262 there is described anaerobic curing compositions which use accelerators selected from the group consisting of imides, formamide and combinations thereof. By use of these accelerators, even the relatively slow-acting hydroperoxide catalysts can be made effective for commercial application.

Although as little as 0.01 percent of catalyst can be employed, it is preferable to utilize about 1 to 10 percent by weight for optimum speed in curing and most desirable storage characteristics. Amounts in excess of 15 percent by weight produce no additional beneficial effect and, in fact, have a tendency to act as a diluent for the cured composition.

The monomer and catalyst are preferably used in combination with small amounts of tertiary amines and particularly organic tertiary amines wherein all three valences of the nitrogen atom are satisfied by carbon atoms. The carbon atoms may be part of alkyl, carbocyclic or heterocyclic groups, either substituted or unsubstituted. Generally trialkylamines and dialkyl aryl amines are most conveniently employed; however, other compounds within the scope of the above definition are also suitable for the present invention; the requirement being that there be no free hydrogen on the nitrogen atom of the amine if storage is desirable. The tertiary amine is preferably liquid at room temperature for ease in handling and mixing, although gaseous and solid compounds may be employed by dispersing them in the monomer. Exemplary of the various amines which may be utilized are triethylamine, tripropylamine, tributylamine, triamylamine, N,N-dimethylaniline and N,N-dimethyl-toluidine.

The amounts of hydroperoxide catalyst and tertiary amine added to the monomer should be sufficient to polymerize the monomer within about eight hours when the composition is confined between close-fitting metal parts, but should also provide a shelf life of at least one month, and preferably even greater lengths of time, i.e., no gelation should be observable during the time specified. Generally, only minor amounts, less than 15 percent by weight, of the hydroperoxide and amine are necessary. Although it has been found that as little as 0.01 percent by weight of the hydroperoxide and 0.1 percent by weight of the amine will provide anaerobic curing properties, generally about 1–15 percent of the hydroperoxide and 1–10 percent of the amine are conveniently employed for quick curing compositions, and preferably about 2–10 percent of the hydroperoxide and 2–8 percent of the amine for optimum curing and storage properties.

The sealant mixtures of the present invention are non-volatile and may be made up in varying viscosities depending upon the monomer, catalyst and amine selected, and whether or not thickening agents are added. For use in bonding closely fitting surfaces or for application to previously assembled parts where it is desired to have the sealant penetrate between mating surfaces, a thin liquid of low viscosity having good capillary action characteristics is preferred. For sealing or bonding loose fitting surfaces where there are relatively large spaces or voids to be filled, it generally is preferred to select a sealant mixture which is relatively viscous.

The sealant mixtures of the present invention may be applied in relatively small amounts, usually only a drop or two, to the surfaces to be joined either prior or subsequent to joining. In general it is preferred to degrease the surfaces to be joined prior to application of the sealant. In the absence of air, the sealant sets up without appreciable shrinkage to a strong solid resin which is resistant to chemical attack, heat aging and solvent action. Among the surfaces which appear to be most effectively bonded by the sealant of the present invention are glass, ceramic and metal surfaces and combinations thereof. The shear strength of the bond between metal surfaces is frequently as great or greater than that of the metal itself and when using softer metals, such as aluminum, it may be desired to reduce the shear strength of the bond thus produced by employing suitable additives.

When the parts to be treated with sealant are already assembled or joined, the liquid sealant applied thereto will penetrate between the adjoining surfaces by capillary action following which the sealant between the surfaces will rapidly polymerize to a solid resin bond because of the absence of air. Any excess sealant which is not between the surfaces and thus remains exposed to air will remain liquid and can easily be wiped off. When the liquid sealant is applied to the parts prior to assembly or joining, the liquid sealant coating remains exposed to air and thus will remain liquid until the parts are assembled and joined, whereupon the air between the mating surfaces is excluded and causes a solid bond to form between the surfaces. This characteristic is particularly advantageous in the case of fasteners used in large quantities, particularly threaded fasteners such as nuts and bolts, where it may be desirable to apply sealant to large batches or quantities of the parts in advance instead of treating each part individually just prior to assembly. Glass or plastic containers are preferred for storing the mixture. Also it is desirable to avoid storage of the mixture in direct sunlight since this also will accelerate curing and reduce shelf life. The effect of sunlight can be minimized by the use of colored translucent or opaque containers.

Illustrative of the efficacy of compositions made in accordance with the present invention are the following examples:

EXAMPLE I

A mixture of cyclohexyl methacrylate, 7 percent by weight of cumene hydroperoxide and 2 percent by weight of triethyl amine was prepared and a few drops thereof placed on the threads of ⅜-inch steel nuts and bolts. The nuts and bolts were assembled and the torque was measured after twenty-four hours at room temperature. The prevailing torque developed by the composition was 8 foot pounds.

EXAMPLE II

To 9.1 cc. of tetrahydrofurfuryl methacrylate was added 0.63 cc. of cumene hydroperoxide and 0.26 cc. of triethyl amine. The formulation was thoroughly mixed and a few drops were then placed on the threads of ⅜-inch steel nuts and bolts. The nuts and bolts were assembled and the torque was measured after six hours and twenty-four hours at room temperature. The resultant prevailing torques were 0.1 and 14.4 foot pounds, respectively.

The above procedure was repeated using 0.375 cc. of N,N-dimethyl p-toluidine in place of the triethyl amine. The prevailing torque developed after twenty-four hours at room temperature was 4 foot pounds.

EXAMPLE III

To 9.1 cc. of cyclohexyl methacrylate was added 0.63 cc. of cumene hydroperoxide and 0.375 cc. of N,N-dimethyl p-toluidine. The formulation was thoroughly mixed and placed on steel nuts and bolts which were thereafter assembled. The formulation was found to develop a prevailing torque at room temperature of 7.2 foot pounds in six hours and 23.7 foot pounds in twenty-four hours.

EXAMPLE IV

To hydroxypropyl methacrylate was added about 7.0 percent cumene hydroperoxide and 3.0 per cent N,N-dimethyl-p-toluidine. The mixture was applied to the threads of steel nuts and bolts and permitted to cure at room temperature. The composition produced a prevailing torque of 11.6 foot pounds after one hour, 24 foot pounds after three hours and 26.4 foot pounds after six hours.

EXAMPLE V

A formulation was prepared from 2-hydroxyethyl methacrylate, about 7.0 percent cumene hydroperoxide and 2.6 percent triethyl amine. The formulation when applied to steel nuts and bolts produced a prevailing torque of 7.6 foot pounds in six hours and 19.6 foot pounds in twenty-four hours at room temperature.

Satisfactory results were also obtained from a formulation as above wherein 0.3 percent hydrogen peroxide was used in place of cumene hydroperoxide and the amine was N,N-dimethyl-p-toluidine.

EXAMPLE VI

A first formulation was prepared from 45 cc. of cyanoethyl acrylate, 0.15 cc. of the hydrolyzable perester t-butyl peracetate, and 0.1 cc. of a 5 percent solution of quinone. A second formulation was prepared from 45 cc. of glycidyl methacrylate, 4.0 cc. of cumene hydroperoxide and 0.1 cc. of benzoic sulfimide. Both solutions gave excellent results when used to bond nuts and bolts. The first formulation produced a prevailing torque of 4 foot pounds after four hours while the second gave a torque of 20 foot pounds after thirty-six hours.

EXAMPLE VII

A first formulation was prepared from 45 cc. of dimethylaminoethyl methacrylate and 0.15 cc. of hydroxyheptyl peroxide while a second formulation comprised 50 cc. of 1-butylaminoethyl methacrylate and 2 cc. of cumene hydroperoxide. These formulations produced bonds of finger tightness after twenty-four and four hours, respectively.

EXAMPLE VIII

Illustrative of ineffective monoacrylates are the following: A first formulation comprised 45 cc. of methyl methacrylate, 0.1 cc. of cumene and 0.1 cc. of triethyl amine. A second formulation was prepared from 50 cc. of n-butyl methacrylate and 2 cc. of cumene hydroperoxide. In both instances the formulations remained liquid for twenty-four hours and more when applied to assembled steel nuts and bolts.

As will be apparent to persons skilled in the art, various modifications and adaptations of the compositions above-described will become readily apparent without departure from the spirit and scope of the invention, the scope of which is defined in the appended claims.

I claim:

1. An anaerobic curing sealant composition adapted to remain in a liquid, nonpolymerizing state for prolonged periods of time while in contact with air and to polymerize to the solid state in the absence of air and upon contact with metal surfaces comprising a monomer and, by weight of the sealant composition, from .01 to 15 percent of a hydroperoxide catalyst for the monomer, said monomer being predominantly a monoacrylate ester having a single terminal group of the formula

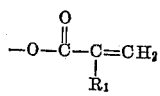

wherein $R_1$ is a member selected from the group consisting of hydrogen, halogen, and lower alkyl of 1–4 carbon atoms; said ester having on the alcoholic portion thereof a reactive center adapted for cross linking, said reactive center being selected from the group consisting of labile hydrogen, the hetero atom of a heterocyclic ring, hydroxy, alkyl substituted amino, cyano and halogen radicals.

2. The composition of claim 1 wherein the sealant composition contains as an additional ingredient a tertiary amine accelerator in an amount of from about 0.1 to about 10 percent by weight of the composition.

3. An anaerobic curing sealant composition adapted to remain in a liquid, nonpolymerizing state for prolonged periods of time when maintained in contact with air and to polymerize to the solid state in the absence of air and upon contact with metal surfaces comprising a monoacrylate ester monomer and, by weight of the sealant composition, from about 1 to about 10 percent of a latent hydroperoxide catalyst for the monomer, said monocrylate ester having the formula A*–B wherein A* is the alcoholic portion of the ester having at least one reactive center thereon, said reactive center being selected from the group consisting of labile hydrogen, the hetero atom of a heterocyclic ring, hydroxy, alkyl substituted amino, cyano and halogen radicals.

4. The composition of claim 3 wherein the hydroperoxide catalyst is an organic hydroperoxide catalyst.

5. The anaerobic curing sealant composition of claim 4 wherein the ester is selected from the group consisting of 2-hydroxyethyl methacrylate, hydroxypropyl methacrylate, cyanoethyl acrylate, t-butylaminoethyl methacrylate, dimethylaminoethyl methacrylate, cyclohexyl methacrylate, glycidyl methacrylate, and tetrahydrofurfuryl methacrylate.

6. The composition of claim 5 wherein the sealant composition contains as an additional ingredient a tertiary amien accelerator in an amount of from about 0.1 to about 10 percent by weight of the composition.

7. The composition of claim 6 wherein the tertiary amine accelerator is from about 2 to about 8 percent by weight of the sealant composition.

8. The composition of claim 7 wherein the monomer is hydroxypropyl methacrylate.

9. In an anaerobic curing sealant composition adapted to remain in a liquid, nonpolymerizing state for prolonged periods of time when maintained in contact with air and to polymerize to the solid state in the absence of air and upon contact with metal surfaces comprising a monomer and, by weight of the sealant composition, from .01 to 15 percent of a latent hydroperoxide catalyst for the monomer, the improvement wherein the monomer is predominantly a monoacrylate ester monomer having a single terminal group of the formula

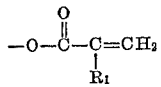

wherein $R_1$ is a member selected from the group consisting of hydrogen, halogen, and lower alkyl of 1–4 carbon atoms and an alcoholic portion with at least one reactive center thereon, said reactive center being selected from the group consisting of labile hydrogen, the hetero atom of a heterocyclic ring, hydroxy, alkyl substituted amino, cyano and halogen radicals.

10. In an anaerobic curing sealant composition adapted to remain in a liquid, nonpolymerizing state for prolonged periods of time when maintained in contact with air and to polymerize to the solid state in the absence of air and upon contact with metal surfaces comprising a monomer and, by weight of the sealant composition, from .01 to 15 percent of a latent hydroperoxide catalyst for the monomer, the improvement wherein the monomer is predominantly a monoacrylate ester of the formula A*–B wherein A* is an alcoholic portion of the ester having at least one reactive center thereon adapted for performing a cross linking operation, said reactive center comprising radicals selected from the group consisting of labile hydrogen, the hetero atom of a heterocyclic ring, hydroxy, alkyl substituted amino, cyano and halogen radicals.

11. The improvement of claim 10 wherein the composition contains as an additional ingredient a tertiary amine accelerator in an amount from about 1 to about 10 percent by weight of the composition.

12. The anaerobic curing sealant composition of claim 11 wherein the monomer is selected from the group consisting of 2-hydroxyethyl methacrylate, hydroxypropyl methacrylate, cyanoethyl acrylate, t-butylaminoethyl methacrylate, dimethylaminoethyl methacrylate, cyclohexyl methacrylate, glycidyl methacrylate, and tetrahydrofurfuryl methacrylate.

References Cited

UNITED STATES PATENTS

| 3,041,322 | 6/1962 | Krieble | 260—89.5 |
| 3,180,777 | 4/1965 | Karo | 260—310 |

FOREIGN PATENTS 1,372,368  8/1964  France.

JOSEPH L. SCHOFER, *Primary Examiner.*

J. C. HAIGHT, *Assistant Examiner.*

U.S. Cl. X.R.

117—132; 156—332; 260—88.5, 88.7, 89.5, 89.7